United States Patent [19]

Fitzgerald et al.

[11] Patent Number: 4,731,399

[45] Date of Patent: Mar. 15, 1988

[54] LATEX MODIFIED ASPHALT FOAMS

[75] Inventors: Paul Fitzgerald, Hixson; Jimmy D. Cross, Signal Mountain, both of Tenn.

[73] Assignee: Polysar Financial Services S.A., Canton of Fribourg, Switzerland

[21] Appl. No.: 808,158

[22] Filed: Dec. 12, 1985

[51] Int. Cl.$^4$ .................. B32B 11/00; C08L 95/00
[52] U.S. Cl. ........................... 524/60; 264/45.1; 428/264; 428/265; 428/267; 428/268; 428/290; 428/291; 428/489
[58] Field of Search ............................................ 524/60

[56] References Cited

U.S. PATENT DOCUMENTS

| | | | |
|---|---|---|---|
| 2,506,339 | 5/1950 | Buckley et al. | 524/60 |
| 2,537,190 | 1/1950 | Lankau et al. | 524/60 |
| 2,768,091 | 10/1956 | Cubberly | 524/60 |
| 2,868,749 | 1/1959 | Hugg et al. | 524/60 |
| 3,027,342 | 3/1962 | Kemp et al. | |
| 3,085,889 | 4/1963 | Swift | 524/60 |
| 3,107,224 | 10/1963 | Rogers, Jr. et al. | |
| 3,334,058 | 8/1967 | Alm | 524/60 |
| 3,645,947 | 2/1972 | Quigg et al. | 524/60 |

FOREIGN PATENT DOCUMENTS

| | | | |
|---|---|---|---|
| 671463 | 10/1963 | Canada | 524/60 |
| 1815026 | 10/1970 | Fed. Rep. of Germany | 524/60 |
| 221461 | 4/1985 | German Democratic Rep. | 524/60 |
| 112974 | 10/1974 | Japan | 524/60 |
| 20931 | 2/1976 | Japan | 524/60 |
| 332525 | 7/1930 | United Kingdom | |
| 332526 | 7/1930 | United Kingdom | |
| 1338477 | 11/1973 | United Kingdom | 524/60 |
| 2006220 | 3/1982 | United Kingdom | |

*Primary Examiner*—James C. Cannon
*Attorney, Agent, or Firm*—Stevens, Davis, Miller & Mosher

[57] ABSTRACT

Latex may be extended with up to about 40% by weight of an emulsion of asphalt, bitumen or coal tar. The extended latex is useful in adhering scrim to carpet or in the manufacture of attached foamed carpet backing.

8 Claims, No Drawings

LATEX MODIFIED ASPHALT FOAMS

BACKGROUND OF THE INVENTION

Latices of natural rubber, synthetic rubber, acrylates, and ethylene vinyl-acetate type polymers have been used to make foams for backing carpet or curtains, to improve the tuft lock of carpet and to adhere secondary backing to carpet. The present invention seeks to provide new compositions suitable for such applications which include latex modified with asphalts.

British Pat. No. 332,525 accepted July 31, 1930, in the name of the Dunlop Rubber Company, discloses a process for manufacturing foam rubber using heat sensitive gelling systems such as ammonium persulfate or delay action gelling agents such as sodium silicofluoride.

British Pat. No. 332,526 accepted July 31, 19830, in the name of the Dunlop Rubber Company, discloses a process for making foam rubber merely by heating a foamed latex.

Since July 31, 1930 foam rubber has found a number of applications including upholstery and carpet backing.

It is known to extend rubber and latex with mineral oil. Generally the oil is a highly refined oil and is used in amounts from about 5 to 25 parts by weight per 100 parts by weight of rubber in the latex. Typical of the types of extending oils which may be used in association with latex foam are those listed in U.S. Pat. No. 3,107,224 issued Oct. 15, 1963 and assigned to the Goodyear Tire and Rubber Company.

It is known to add lactices of polymers such as styrene-butadiene or butadiene-acrylonitrile to emulsions of tar, asphalt or bitumen. Typically, the latex is added in amounts to provide a rubber content of less than 10 percent, preferably less than 5 percent, on a dry weight basis. The modification of tars, asphalts and bitumen provides improved properties to the resulting tar, asphalt or bitumen. Representative of this art is U.S. Pat. No. 3,027,342 issued Mar. 27, 1962, assigned to the Koppers Company Inc.

British Pat. No. 2,006,220 issued Mar. 3, 1982, assigned to the British Petroleum Company, discloses a hardened bitumen modified with a mixture of a thermoplatic and a non-thermoplastic rubber. The bitumen composition is then heated to produce cellular foam.

In the field of carpet backing, there is a requirement for a lower price composition which may be applied directly to the back of a carpet to improve tuft lock and optionally to adhere a scrim backing. Additionally, it would be desirable to develop a material which could be applied to carpet backing as an aqueous based froth which could be set and dried to a rubber type foam.

There is nothing in the prior art which would suggest that a latex of an elastomeric polymer could be extended with an emulsion of asphalt, tar or bitumen.

SUMMARY OF THE INVENTION

The present invention provides a composition comprising from about 30 to about 70 percent by weight of solids comprising on a dry weight basis from about 60 to about 99 parts by dry weight of an emulsion of a polymer selected from the group:

(a) homo- or copolymer or one or more $C_{4-6}$ conjugated diolefins which may be unsubstituted or substituted by a $C_{1-4}$ alkyl radical or a chlorine or bromine atom;

(b) a copolymer of: from about 25 to 80 weight percent of a $C_{4-6}$ conjugated diolefin which may be unsubstituted or substituted by a $C_{1-4}$ alkyl radical or a chlorine or bromine atom; from about 20 to 75 weight percent of a mixture comprising 75 to 100 weight percent of a $C_{8-12}$ vinyl aromatic monomer which may be unsubstituted or substituted by a $C_{1-4}$ alkyl radical or a chlorine or bromine atom and from 0 to 25 weight percent of one or more of a $C_{3-6}$ alkenyl nitrile, and from 0 up to about 15 weight percent of one or more monomers selected from the group consisting of:

(i) $C_{3-6}$ ethylenically unsaturated carboxylic acids, (ii) amides of $C_{3-6}$ ethylenically unsaturated carboxylic acids, which amides may be unsubstituted or substituted by up to two $C_{1-4}$ alkyl or alkanol radicals;

(iii) $C_{1-4}$ alkyl or alkanol esters of $C_{3-6}$ ethylenically unsaturated carboxylic acids;

(iv) $C_{3-6}$ ethylenically unsaturated aldehydes;

(v) and a mixture thereof.

(c) a copolymer of from about 0.5 to about 20 weight percent of a $C_{2-4}$ olefin; and from about 99.5 to about 80 weight percent of a monomer selected from the group $C_{1-8}$ alkyl or alkanol esters of $C_{3-6}$ ethylenically unsaturated carboxylic acids; $C_{2-8}$ alkenyl or alkanol esters of $C_{1-8}$ ethylenically saturated carboxylic acids;

(d) a copolymer of from about 60 to about 99.5 weight percent of a $C_{1-4}$ alkyl or alkanol ester of a $C_{3-6}$ ethylenically unsaturated carboxylic acid; and from about 0.5 to 40 weight percent of one or more monomers selected from the group consisting of:

(i) $C_{3-6}$ ethylenically unsaturated carboxylic acids;

(ii) amides of $C_{3-6}$ ethylenically unsaturated carboxylic acids, which amides may be unsubstituted by up to two $C_{1-4}$ alkyl or alkanol radicals;

(iii) $C_{3-6}$ ethylenically unsaturated aldehydes, (iv) or a mixture thereof.

and from about 1 to about 40 parts by dry weight of an emulsion compatible with said emulsion of polymer, of a member selected from the group asphalt, bitumen, tar and a mixture thereof.

The present invention provides carpet backed with the above compositions in a foamed or unfoamed state.

The present invention also contemplates a foam derived from the above composition.

DETAILED DESCRIPTION OF THE INVENTION

The emulsions in accordance with the present invention may include natural or synthetic polymers. The emulsion may be a homopolymer of isoprene such as natural rubber. The emulsion may be of a synthetic polymer which is a co- or homopolymer of a $C_{4-6}$ conjugated diolefin which may be unsubstituted or substituted by a $C_{1-4}$ alkyl radical or a chlorine or bromine atom. Neoprene and polybutadiene rubbers are representative of one class of polymer which may be in the polymeric emulsions according to the present invention.

A further class of polymer which may be used in the emulsions in accordance with the present invention are synthetic rubbers. These rubbers may comprise from about 25 to 80 weight percent of monomers which yield homopolymers having a $T_g$ below room temperature and from about 75 to 20 weight percent of monomers which yield homopolymers having a Tg greater than room temperature. These classes of monomers are referred to as soft and hard monomers respectively.

The soft monomer may be a $C_{4-6}$ conjugated diolefin which is unsubstituted or substituted by a $C_{1-4}$ alkyl radical or a chlorine or bromine atom.

The hard monomer may be a mixture comprising from about 75 to 100 percent of a $C_{8-12}$ vinyl aromatic monomer which is unsubstituted or substituted by a $C_{1-4}$ alkyl radical or a chlorine or bromine atom. The hard monomer may include up to about 25 percent of a $C_{3-6}$ alkenyl nitrile.

Suitable vinyl aromatic monomers include styrene, alpha methyl styrene, para-methyl-styrene, para-chlorostyrene, and divinyl benzene. Suitable $C_{3-6}$ alkenyl nitriles include acrylonitrile and methacrylonitrile.

The synthetic rubber may include up to about 15, preferably less than about 10, weight percent of one or more functional monomers. Suitable functional monomers include copolymerizable acids, aldehydes, amides and esters. Suitable acids include $C_{3-6}$ ethylenically unsaturated carboxylic acids such as acrylic acid, methacrylic acid, fumaric acid and itaconic acid. Copolymerizable amides include amides of $C_{3-6}$ ethylenically unsaturated carboxylic acids. Such amides may be unsubstituted or substituted by up to two $C_{1-4}$ alkyl or alkanol radicals. Such amides include acrylamide, methacrylamide, N-methylol acrylamide and N-methylol methacrylamide. The esters which may be used in accordance with the present invention are $C_{1-4}$ alkyl or alkanol (hydroxy alkyl) esters of $C_{3-6}$ ethylenically unsaturated carboxylic acids. Suitable esters include methyl acrylate, ethyl acrylate, methyl methacrylate, ethyl methacrylate, hydroxy ethyl acrylate, and the like. The most useful aldehyde is acrolein, although other $C_{3-6}$ ethylenically unsaturated aldehydes may be used in accordance with the present invention. In some cases it may be desirable to use a mixture of functional monomers.

Preferably the polymer comprises from about 50 to about 80 weight percent of the $C_{4-6}$ conjugated diolefin and from about 20 to 50 weight percent of a mixture comprising from about 75 to 100 weight percent of the vinyl aromatic monomer and from about 0 to 25 weight percent of a $C_{3-6}$ alkenyl nitrile. Preferred conjugated diolefins include butadiene and isoprene. Preferred vinyl aromatic monomers include styrene, and alpha methyl styrene.

If the polymer contains one or more functional monomers, they are usually present in amounts less than 10 weight percent, most preferably not in excess of about 5 weight percent. Preferred functional groups include the above listed acids, amides and esters. It should be noted that acrylate esters of $C_{1-2}$ alcohols are considered by some to be hard monomers. Thus a polymer could contain up to about 15 weight percent of such an acrylate and 5 percent of other functional monomers.

Useful polymers, in emulsion form, in accordance with the present invention include copolymers of from about 0.5 to about 20 weight percent of a $C_{2-4}$ olefin and the balance a copolymerizable ester which may be a $C_{1-8}$ alkyl or alkanol ester of a $C_{3-6}$ ethylenically unsaturated acid or a $C_{2-8}$ alkenyl or alkenol (hydroxyl alkenyl) ester of a $C_{1-8}$ ethylenically unsaturated carboxylic acid. Suitable olefins include ethylene and propylene. Preferred esters of unsaturated acids are represented by the acrylates such as ethyl, hydroxy ethyl and butyl acrylates or methacrylates. Preferred esters of saturated acids are vinyl acetate and its homologues. Preferred polymers comprise ethylene and vinyl acetate in a weight ratio from about 5:95 to 20:80.

A further class of polymers which may be used in accordance with the present invention are the acrylate polymers. These polymers comprise from about 60 to 99.5 weight percent of a $C_{1-4}$ alkyl or alkanol ester of a $C_{3-6}$ ethylenically unsaturated carboxylic acid and the balance one or more functional monomers as described above. The preferred alkanol esters are lower alkyl and alkanol esters of acrylic and methacrylic acid.

The emulsion of asphalt, bitumen or tar may be purchased commercially or may be prepared using a colloid mill. The asphalt, tar or bitumen is mixed in the colloid mill together with water and an emulsifier. The emulsifier in the asphalt, bitumen or tar emulsion must be compatible with the emulsifier in the latex. Cationic and anionic emulsifiers cannot be used in the same composition, although either type of emulsifier may be used with a non-ionic emulsifier. Generally the emulsion may comprise up to about 80 weight percent of asphalt, bitumen, or tar, from about 0.5 to about 10, preferably from about 0.1 to about 3 weight percent of an emulsifier and the balance water. Preferably the asphalt, bitumen or tar should be semi-solid. That is it should have a penetration at 25° C. under a load of 100 g for five seconds of not less than 10 and not more than about 350.

Suitable asphalts include those sold under the trademark AMOCO (120–150 penetration grade asphalt). The asphalt, bitumen or tar emulsion may be used in an amount up to about 40 weight percent on a dry basis of the composition of the present invention. Preferably, the asphalt, bitumen or tar is used in an amount from about 10 to 20 weight percent of the composition on a dry basis.

The compositions of the present invention may further include fillers and vulcanizing agents. Typical fillers used in accordance with the present invention are particulate mineral fillers such as clays, talc, calcium carbonate, silicates, and aluminum trihydrate. Calcium carbonate is particularly desirable from a cost viewpoint. The filler may be used in amounts up to about 500 parts by weight per 100 parts by weight of latex solids (i.e. rubber and asphalt, bitumen or tar). For foam applications the filler should be used in amounts not greater than 350, preferably less than 250, parts by weight per 100 parts by weight of binder solids. In some instances, it may be desirable to use additional emulsifier to stabilize the resulting compound. The additional emulsifier should also be compatible with the emulsifiers used in the latex and the asphalt, bitumen and tar emulsion. Typical of suitable emulsifiers are alkali or ammonium salts of long chain fatty acids such as the stearates and palmitates or alkali metal salts of pyrophosphates such as sodium pyrophosphate or a mixture thereof. These additional surfactants may be used in amounts from about 0.5 up to about 5, preferably from about 0.5 to about 2 parts by weight per 100 parts by dry weight of latex and asphalt, bitumen or tar emulsion.

Surprisingly, the compositions of the present invention may be vulcanized when the polymer in the latex contains unsaturated bonds. This is particularly true if the latex contains a conjugated diolefin. The cure agent or curing systems may be selected from those available in the form of a liquid emulsion. A suitable cure system or mixture of vulcanizing agents is available as Polycure 590. Generally the cure or vulcanizing system is present in an amount from about 2 to 15, preferably from about 4 to 10 parts by weight per 100 parts by weight of polymer.

The compositions of the present invention are prepared as emulsions. The emulsion may have a total solids from about 30 to 90 weight percent. Generally the solids level in the emulsions of the present invention is in the range from about 40 to 75 weight percent.

The compositions of the present invention may be used in a number of applications. The compositions may be used to coat, impregnate or saturate various types of substrates. The substrates may be woven, non woven or even extruded sheet or web material. The substrate may be manufactured from cellulosic fibers such as cellulose or rayon. The substrate may be made from woven or non woven synthetic fiber such as polyester, poly amides, aramides, or polyolefins. The substrate may be an extruded sheet material such as a polyolefin. The fiber may also be glass in the case of shingles or geotextiles. Generally the composition is applied to the substrate in an amount from about 1 to 75 oz/yd². In the case of impregnation generally higher amounts of composition may be used. This would be useful in making non woven asphalt impregnated felts such as tar paper or for geotextiles and the like. For surface coating or impregnation the coat weight is generally from about 3 to about 25 oz/yd². This is useful in coating membranes for water proofing and for coating poly olefin scrim for carpet backing. The composition of the present invention may be applied as a foam to control application rates. It is also possible to use the compound per se in the manufacture of a foamed secondary carpet backing. In this type of application the compound may or may not contain a gelling agent such as an alkali silicofluoride or ammonium salt of a $C_{1-4}$ organic acid in the present of a zinc or cadmium ion. Such gelling systems are disclosed in U.S. Pat. Nos. 4,214,053 and 3,804,558 issued July 22, 1980 and Sept. 9, 1975. The compound may be foamed with conventional foaming apparatus such as a Hobart (trademark) or Oakes (trademark) mixer. Generally, if the composition is frothed, it is frothed to a volume of from about 1.5 to about 7, preferably 2 to 5 times its original volume. The foam is then applied to the carpet backing and set and dried.

Generally, the foam is subject to a bank of infra-red heaters from about 1 to 15, preferably 5 to 10 minutes to initially heat the foam. The foam is then dried in a tunnel heater at temperatures from about 100° C. to 250° C., preferably 150°–200° C.

The compositions of the present invention are particularly useful in increasing the tuft lock or tuft bind in carpet backing. Preferably the compositions are used in association with carpets manufactured from polyamide or polyester yarns using a synthetic scrim such as a polyolefin. The compositions may also be used to attach synthetic scrims to a carpet. The compositions are particularly useful to attach polyolefin backing to carpet.

The following examples are intended to illustrate the invention and are not intended to limit it.

Four compositions were prepared for backing a carpet comprising synthetic fiber and a polyolefin scrim (grass mat). In the formulation the base latex was a carboxylated SBR latex sold by Polysar Inc. as PL 2411. A 120–150 penetration grade asphalt was emulsified in a colloid mill for 2 minutes with a surfactant. The compounds were then formulated. In the formulation the parts are in dry parts by weight unless otherwise specified. The compositions are set forth in Table I.

TABLE I

| INGREDIENT | | | | |
|---|---|---|---|---|
| PL 2411 | 100 | 90 | 80 | 60 |
| Asphalt | — | 10 | 20 | 40 |
| Calcium carbonate | 300 | 300 | 300 | 300 |
| Soap | 25 | 25 | 25 | 25 |
| Sodium polyacrylate Thickener | To Viscosity of 9,000 to 10,000 cps (Brookfield - #5 @ 20) | | | |

The compounds were frothed in a Hobart mixer to a 350 gram per quart density and spread on the back of a series ⅜ inch grass carpet samples at approximately 15 oz/yd². The samples were cured at 275° for twenty minutes. The next day one set of the swatches were tested for tuftbinds. The second and third sets were soaked in water for thirty minutes. Then the second set had tuftbinds pulled while wet. The third set was dried for twenty more minutes before pulling tuftbinds. The results are set forth in Table II.

TABLE II

GRASS COATING TUFTBINDS

| | Dry Lbs. | Wet Lbs. | Re-Dried Lbs. |
|---|---|---|---|
| (1) Control | 3.50 | 1.50 | 4.00 |
| | 3.50 | 1.50 | 3.75 |
| | 3.00 | 1.30 | 3.70 |
| | 2.75 | 1.30 | 3.80 |
| | 2.75 | 1.00 | 3.75 |
| Coating Weight = 15.0 oz/yd² | Avg. 3.10 | Avg. 1.32 | Avg. 3.80 |
| (2) Asphalt (10% Replacement) | 4.50 | 3.40 | 5.00 |
| | 6.50 | 2.60 | 4.50 |
| | 3.50 | 2.00 | 4.10 |
| | 3.00 | 2.00 | 3.80 |
| | 6.00 | 1.70 | 3.50 |
| Coating Weight = 17.0 oz/yd² | Avg. 4.70 | Avg. 2.34 | Avg. 4.18 |
| (3) Asphalt (20% Replacement) | 4.25 | 2.50 | 7.00 |
| | 3.75 | 2.00 | 6.40 |
| | 3.50 | 2.00 | 5.20 |
| | 3.50 | 2.00 | 5.00 |
| | 3.00 | 1.80 | 4.00 |
| Coating Weight = 16.0 oz/yd² | Avg. 3.60 | Avg. 2.10 | Avg. 5.50 |
| (4) Asphalt (40% Replacement) | 3.50 | 2.50 | 4.50 |
| | 3.50 | 2.00 | 3.80 |
| | 5.00 | 1.50 | 3.40 |
| | 2.50 | 1.50 | 3.00 |
| | 2.25 | 1.70 | 2.50 |
| Coating Weight = 16.0 oz/yd² | Avg. 3.35 | Avg. 1.80 | Avg. 3.44 |

The tuft bind in the carpet increased at the 10 and 20 weight percent incorporation of asphalt. At 40% there was increased tuft lock but the cleaning of the foaming equipment was more difficult. There was an odour associated with the 40% incorporation of asphalt.

EXAMPLE 2

Three formulations of a no-gel foam were prepared based on a non carboxylated SBR latex sold by Polysar Inc. as PL 404. In the formulation all parts are by dry weight unless specified.

The formulations are set forth in Table III.

TABLE III

| Ingredients | | | |
|---|---|---|---|
| PL 404 | 100 | 90 | 80 |
| Asphalt | — | 10 | 20 |
| Electrolyte (TKPP) | 0.7 | — | — |
| Soap | 4.0 | — | — |
| Calcium Carbonate | 300 | — | — |

TABLE III-continued

| Ingredients | | | |
|---|---|---|---|
| Polycure #590 (vulcanizing agents) | 5.9 | — | — |
| Colour (Black) | 0.2 | — | — |
| | Water to 82.0% solids | | |

The compound was then frothed and the foam was applied to the back of a grass mat at ¼" thickness then cured at 275° F. for 300 min.

The comparison properties are set forth in Table IV.

TABLE IV

| | (1) Control | (2) 10% | (3) 20% |
|---|---|---|---|
| Compound Visc. #5 @ 20 RVT | 2,200 | 2,300 | 2,300 |
| Compound pH | 10.5 | 10.4 | 10.4 |
| Density lbs/ft$^3$ | 8.88 | 8.75 | 8.20 |
| Compression Resistance lbs/in$^2$ | 1.95 | 1.85 | 0.70 |
| Delamination lbs/in | 0.50 | 0.40 | 0.33 |
| Tensile lbs/in$^2$ | 4.7 | 3.8 | 2.6 |
| Elongation, % | 150 | 100 | 90 |
| Compression Set | 23.0% | 18.7% | 26.9% |

At 20% asphalt there was some emulsion instability in the frothed state.

EXAMPLE 3

To try to reduce the emulsion instability a further compound was prepared. The formulation is set forth in Table V in which all parts are by dry weight unless otherwise specified.

TABLE V

| INGREDIENT | DRY PARTS |
|---|---|
| PL 404 Latex | 75.00 |
| Electrolyte | 1.00 |
| Water to 80.0% | |
| Fatty acid Soap | 1.00 |
| Asphalt | 25.00 |
| Synthetic soap | 3.50 |
| Calcium carbonate | 200.00 |
| Polycure-590 (vulcanizing agents) | 5.90 |
| | 311.40 |

The emulsion was stable in a frothed state. The compound was foamed and cured as the Control in Table III (i.e. 100 parts of PL 404). The resulting foam had a density of 8.3 lb/ft$^3$; a delamination strength from the carpet substrate of 0.90 lb/in$^2$ and a compression resistance of 1.30 lb/in$^2$.

The above experiments indicate that up to 40% of a latex may be replaced by asphalt.

What is claimed is:

1. A composition comprising from about 30 to about 70 percent by weight of solids comprising on a dry weight basis from about 60 to about 99 parts by dry weight of an emulsion of a polymer selected from the group:
   (a) homo- or copolymer of one or more $C_{4-6}$ conjugated diolefins which may be unsubstituted or substituted by a $C_{1-4}$ alkyl radical or a chlorine or bromine atom;
   (b) a copolymer of: from about 25 to 80 weight percent of a $C_{4-6}$ conjugated diolefin which may be unsubstituted or substituted by a $C_{1-4}$ alkyl radical or a chlorine or bromine atom; from about 20 to 75 weight percent of a mixture comprising 75 to 100 weight percent of a $C_{8-12}$ vinyl aromatic monomer which may be unsubstituted or substituted by a $C_{1-4}$ alkyl radical or a chlorine or bromine atom and from 0 to 25 weight percent of one or more of a $C_{3-6}$ alkenyl nitrile, and from 0 up to about 15 weight percent of one or more monomers selected from the group consisting of:
       (i) $C_{3-6}$ ethylenically unsaturated carboxylic acids;
       (ii) amides of $C_{3-6}$ ethylenically unsaturated carboxylic acids, which amides may be unsubstituted or substituted by up to two $C_{1-4}$ alkyl or alkanol radicals;
       (iii) $C_{1-4}$ alkyl or alkanol esters of $C_{3-6}$ ethylenically unsaturated carboxylic acids;
       (iv) $C_{3-6}$ ethylenically unsaturated aldehydes;
       (v) and a mixture thereof;
   (c) a copolymer of from about 0.5 to about 20 weight percent of a $C_{2-4}$ olefin; and from about 99.5 to about 80 weight percent of a monomer selected from the group $C_{1-8}$ alkyl or alkanol esters of $C_{3-6}$ ethylenically unsaturated carboxylic acids; $C_{2-8}$ alkenyl or alkanol esters of $C_{1-8}$ ethylenically saturated carboxylic acids;
   (d) a copolymer of from about 60 to about 99.5 weight percent of a $C_{1-4}$ alkyl or alkanol ester of a $C_{3-6}$ ethylenically unsaturated carboxylic acid; and from about 0.5 to 40 weight percent of one or more monomers selected from the group consisting of:
       (i) $C_{3-6}$ ethylenically unsaturated carboxylic acids;
       (ii) amides of $C_{3-6}$ ethylenically unsaturated carboxylic acids, which amides may be unsubstituted by up to two $C_{1-4}$ alkyl or alkanol radicals;
       (iii) $C_{3-6}$ ethylenically unsaturated aldehydes,
       (iv) or a mixture thereof;
   from about 1 to about 40 parts by dry weight of an emulsion compatible with said emulsion of polymer, of a member selected from the group asphalt, bitumen, tar and a mixture thereof; per 100 parts by dry weight of said emulsion of up to 350 parts by dry weight of a particulate mineral filler and a stabilizer of from 0.5 to 1.5 parts by weight of a pyrophosphate and from 0.5 to 1.5 parts by weight of a salt of a long chain fatty acid.

2. A composition according to claim 1 comprising from about 60 to about 90 parts by dry weight of a latex of a copolymer of from about 50 to 70 weight percent of a $C_{4-6}$ conjugated diolefin which may be unsubstituted or substituted by a $C_{1-4}$ alkyl radical or a chlorine or bromine atom; and from about 50 to about 20 weight percent of a mixture comprising 75 to 100 weight percent of a vinyl aromatic monomer which may be unsubstituted or substituted by a $C_{1-4}$ alkyl radical or a chlorine or bromine atom; and up to 25 weight percent of $C_{3-6}$ alkenyl nitrile; and from about 10 to 40 parts by dry weight of an emulsion selected from the group asphalt, bitumen, tar and a mixture thereof.

3. A composition according to claim 1 wherein said emulsion is selected from the group asphalt, bitumen, tar and a mixture thereof and is present in an amount from about 10 to about 20 parts by dry weight and said polymer is present in an amount from about 90 to 80 parts by dry weight.

4. A composition according to claim 1 wherein said conjugated diolefin is selected from the group consisting of butadiene, isoprene and a mixture thereof, said vinyl aromatic monomer is styrene or alpha methyl styrene and said alkenyl nitrile is absent.

5. A composition according to claim 1 further comprising from about 4 to about 15 parts by dry weight of a vulcanizing agent or agents per 100 parts by weight of polymer.

6. A composition according to claim 5 comprising from about 60 to 90 parts by dry weight of a latex of a copolymer of from about 50 to 80 weight percent of a $C_{4-6}$ conjugated diolefin which may be unsubstituted or substituted by a $C_{1-4}$ alkyl radical; from about 20 to 50 parts by weight of a vinyl aromatic monomer which may be unsubstituted or substituted by a $C_{1-4}$ alkyl radical or chlorine or bromine atom; and from about 0 to 10 weight percent of one or more monomers selected from the group:
  (i) $C_{3-6}$ ethylenically unsaturated carboxylic acids,
  (ii) amides of $C_{3-6}$ ethylenically unsaturated carboxylic acids, which amides may be unsubstituted or substituted at the nitrogen atom by up to two $C_{1-4}$ alkyl or alkanol radicals; and from about 10 to 20 parts by dry weight of an asphalt emulsion.

7. A composition according to claim 6 wherein said conjugated diolefin is selected from the group consisting of butadiene, isoprene and a mixture thereof; said vinyl aromatic monomer is styrene and said $C_{3-6}$ ethylenically unsaturated carboxylic acid is selected from the group consisting of acrylic acid, methacrylic acid, fumaric acid, maleic acid, itaconic acid and a mixture thereof; and said amide is selected from the group acrylamide, methacrylamide; N-methylol acrylamide; N-methylol methacrylamide and a mixture thereof.

8. A composition according to claim 7 wherein the asphalt in said asphalt emulsion has a penetration grade in the range from less than 10 at 25° C. under a load of 100 g for 5 seconds to not more than 350 at 25° C. under a load of 50 g for 5 seconds.

* * * * *